J. E. CALDWELL.
WEED PLOW FOR PLANTS.
APPLICATION FILED OCT. 2, 1908.

986,438.

Patented Mar. 14, 1911.

WITNESSES.

INVENTOR
J. E. CALDWELL.
BY
ATT'Y.

UNITED STATES PATENT OFFICE.

JAMES ERNEST CALDWELL, OF CITY VIEW, ONTARIO, CANADA.

WEED-PLOW FOR PLANTS.

986,438.                    Specification of Letters Patent.    Patented Mar. 14, 1911.

Application filed October 2, 1908.  Serial No. 455,836.

*To all whom it may concern:*

Be it known that I, JAMES ERNEST CALDWELL, of City View, in the county of Carleton, Province of Ontario, Canada, have invented certain new and useful Improvements in Weed-Plows for Plants, of which the following is a specification.

My invention relates to weed plows for plants, and the objects of my invention are to provide simple and effective means for plowing the soil to eliminate weeds on the sides of rows of plants; and it consists essentially of a wheeled truck having divergent pairs of pivoted arms with rotatable divergent disks adapted to extend into the soil on the opposite side of a row of plants, and means for guiding the truck and disks, as hereinafter more fully set forth and described in the accompanying specifications and drawings.

Figure 1:
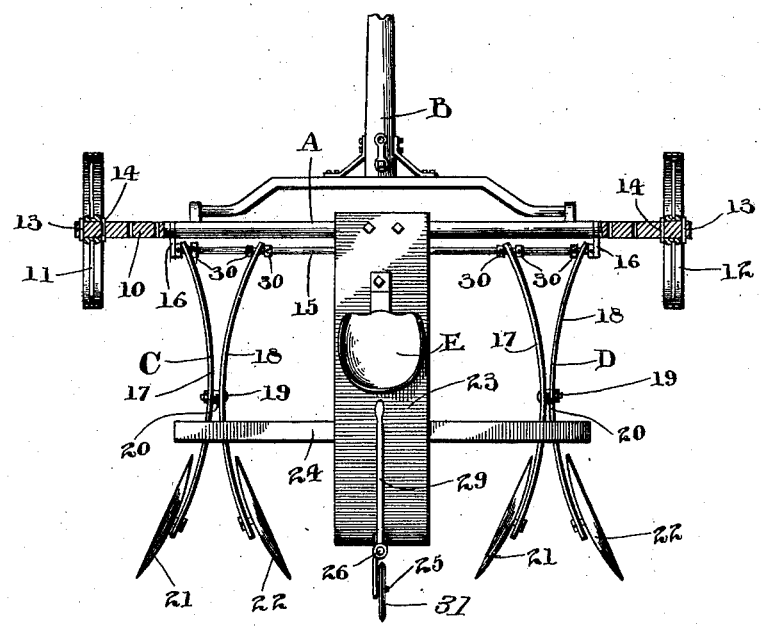
Figure 2:
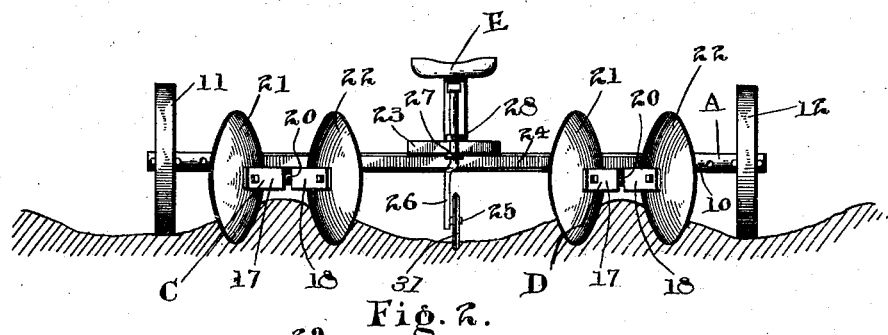
Figure 3:
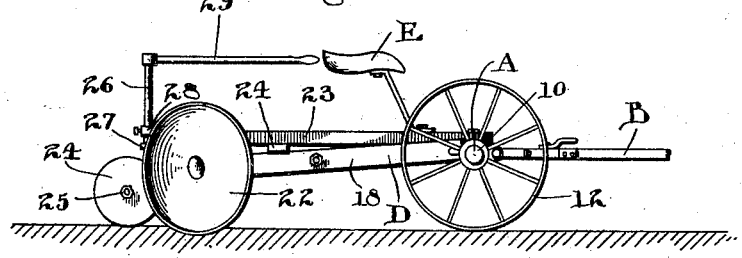

In the drawings,—Figure 1 is a plan view of the plow. Fig. 2 is a rear view of the same. Fig. 3 is a side view.

In the drawings, like letters and figures of reference indicate corresponding parts in each figure.

In the cultivation of various vegetable plants, such as turnips, the plants after sowing come up quickly with the weeds and it is necessary to cut away the weeds near the plants and to cut close to the plants without disturbing them. This, in the past, has generally been done by hand and is a very tedious process, so much so that many farmers have given up the cultivation of such plants.

The present invention aims to cut the earth away from each side of the drills, leaving a narrow space on each side of the plants which can be readily hoed.

Referring to the drawings, A represents the wheeled truck comprising an axle 10 with wheels 11 and 12 adjustably mounted on the end thereof, as by the pins 13 and 14 extending in apertures through the axle on each side of the wheel. The driving shaft B is suitably attached to the front side of the axle. On the rear side of the axle, transversely extending bar 15 is supported from the axle by short arm 16 and from this bar a plurality of pairs of pivoted arms C and D are provided, each pair consisting of two convexed arms 17 and 18 connected about their center by a bolt 19 and spacing plate 20. These arms are held in adjustable position on the bar 15 by means of collars 30 having suitable clamping set screws thereon. The inner end of these arms is pivoted to the bar 15 while the outer end rotatably supports disks 21 and 22. These disks are of the form usually found in disk harrows and their support from the the arms is preferably accomplished by the employment of ball bearings which will facilitate their rotation.

Owing to the divergence of the ends of the arms, the disks will be convergingly inclined toward each other on the forward end and they are adapted to extend on each side of the drill containing the rows of plants, as illustrated in Fig. 2.

The distance between the pairs of arms C and D will be the distance between the rows of plants.

A seat E is provided for the driver, being supported from a platform 23 connected to the axle 10 and to a cross-bar 24 which rests on the pairs of arms C and D.

As the disks are free to move up and down, it is necessary to provide some guiding means for them and this is accomplished by providing a flat disk 31 supported on a trunnion 25 on the end of a vertically extending shaft 26, which extends through a bearing 27 on the end of the platform 23 and is retained in position by an adjustable collar 28 which abuts the upper side of the platform 23, the top of the shaft being provided with a handle 29 extending to near the driver's seat and by means of which the shaft 26 may be rotated and the disk 31 turned to either side. The action of this disk 31 is substantially like that of a rudder and by means of it the plow can be accurately guided and kept in the desired position.

It is evident that if desired the handle might extend toward the rear, and in this case the operator would follow the plow instead of being seated thereon.

In operation, the wheels 11 and 12 are adjusted so that they will fit in the space between the drills and the pairs of arms are adjusted so that the distance between their center line will be the distance between the drills. Then, as the plow moves forward, the disks will cut the earth away from each side of the drills, leaving the plants untouched in the center. The small space left untouched in the center may then be hoed by hand to clear the same of weeds.

As many changes could be made in the above construction, and many apparently widely different embodiments of my invention could be made without departing from the spirit or scope thereof, it is intended that all matter contained in these specifications and drawings shall be interpreted as illustrative and not in a limiting sense.

What I claim as my invention is:

A cultivator including a suitable truck having a transversely extending bar supported on the back thereof, a purality of pairs of arms converging toward each other and meeting intermediate their ends, connecting means passing through said arms at their meeting point, said arms being connected to said cross bar at their forward ends and carrying disks upon their rearward diverging ends, said disks being parallel with the said outer ends and converging forwardly and means located on said cross bar for adjusting the position of said arms in a lateral direction, whereby the disks may be brought together and the converging angle thereof, altered.

In witness whereof I have hereunto set my hand in the presence of two witnesses.

JAMES ERNEST CALDWELL.

Witnesses:
RUSSEL S. SMART,
M. GILBERTSON.

Copies of this patent may be obtained for five cents each, by addressing the "Commissioner of Patents, Washington, D. C."